United States Patent [19]

Ieki

[11] Patent Number: 5,260,568
[45] Date of Patent: Nov. 9, 1993

[54] ABSOLUTE POSITION DETECTOR WITH DIFFRACTION GRATING WINDOWS AND SPOT POSITION DETECTION

[75] Inventor: Atsushi Ieki, Niwa, Japan

[73] Assignee: Okuma Corporation, Aichi, Japan

[21] Appl. No.: 23,861

[22] Filed: Feb. 25, 1993

Related U.S. Application Data

[63] Continuation of Ser. No. 732,121, Jul. 18, 1991, abandoned.

[30] Foreign Application Priority Data

Jul. 18, 1990 [JP] Japan .................................. 2-190119

[51] Int. Cl.⁵ .............................................. G01D 5/34
[52] U.S. Cl. ............................ 250/231.18; 250/237 G
[58] Field of Search ......... 250/237 G, 231.14, 231.18; 356/374, 373, 375

[56] References Cited

U.S. PATENT DOCUMENTS

4,950,891 8/1990 Matsui ........................... 250/237 G
4,979,827 12/1990 Matsui ........................... 250/237 G

Primary Examiner—David C. Nelms
Attorney, Agent, or Firm—Wenderoth, Lind & Ponack

[57] ABSTRACT

An optical absolute position encoder capable of obtaining absolute position data in a wide range utilizes the fact that the position of a transmitted or reflected light beam is shifted in accordance with the displacement of a grating window and the fact that the grating window can be specified depending upon the characteristics of the light beam which has passed through the grating window. Furthermore, precise position data is obtained by using two gratings which move relatively. The above-described data are combined with each other so that absolute position data revealing high resolution can accurately be obtained for a long stroke.

2 Claims, 10 Drawing Sheets

ABSOLUTE POSITION DETECTOR WITH DIFFRACTION GRATING WINDOWS AND SPOT POSITION DETECTION

This application is a continuation of now abandoned application, Ser. No. 07/732,121, filed on Jul. 18, 1991.

BACKGROUND OF THE INVENTION

1. Field of the Invention

The present invention relates to an optical absolute position encoder for measuring the position of a machine tool such as a turning machine and a milling machine or an apparatus for manufacturing semiconductors.

2. Description of the Related Art

Figure 1:
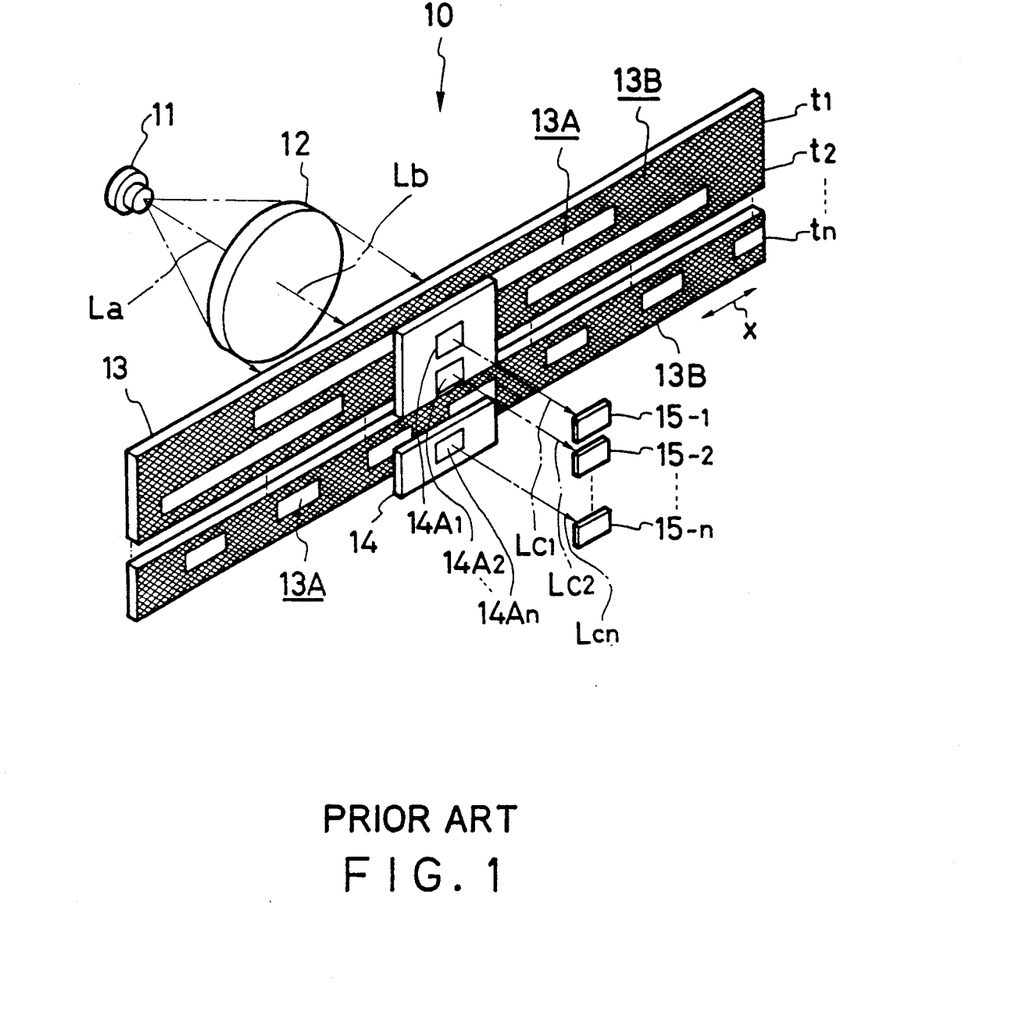
FIG. 1 is a perspective structural view which illustrates the optical system of a conventional optical absolute-position encoder.

FIG. 1 is a perspective structural view which illustrates an optical system of a conventional optical absolute position encoder. Referring to FIG. 1, the optical absolute-position encoder comprises a collimator lens 12 for forming measuring light beams La, which have been emitted from a light emitting element 11 such as an LED (Light Emitting Diode) or a lamp, into parallel light beams Lb. The optical absolute position encoder further comprises a first scale 13 in which n (n is an integer) grating tracks $t_1, t_2, \ldots,$ and $t_n$ are formed in parallel to one another on the surface thereof, the grating tracks $t_1, t_2, \ldots,$ and $t_n$ being arranged in such a manner that portions (hereinafter called "transmissible portions") 13A for transmitting the parallel light beams Lb, which have passed through the collimator lens 12 and portions (hereinafter called "non-transmissible portions") 13B for blocking the same are repeated at predetermined lengths (hereinafter called a "grating pitches"). The optical absolute position encoder further comprises a second scale 14 in which transmissible windows $14A_1, 14A_2, \ldots,$ and $14A_n$ for transmitting light beams (omitted from illustration), which have passed through the above-described transmissible portions 13A, are formed to correspond to the grating tracks $t_1, t_2, \ldots,$ and $t_n$ of the first scale 13. In addition, the optical absolute position encoder comprises photoelectrical converting elements 15-1, 15-2, $\ldots,$ and 15-n disposed to confront the transmissible windows $14A_1, 14A_2, \ldots,$ and $14A_n$ of the second scale 14 for respectively converting light beams $Lc_1, Lc_2, \ldots,$ and $Lc_n$, which have passed through the corresponding transmissible windows $14A_1, 14A_2, \ldots,$ and $14A_n$, into electrical signals which correspond to the intensities of the light beams $Lc_1, Lc_2, \ldots,$ and $Lc_n$.

Figure 2:
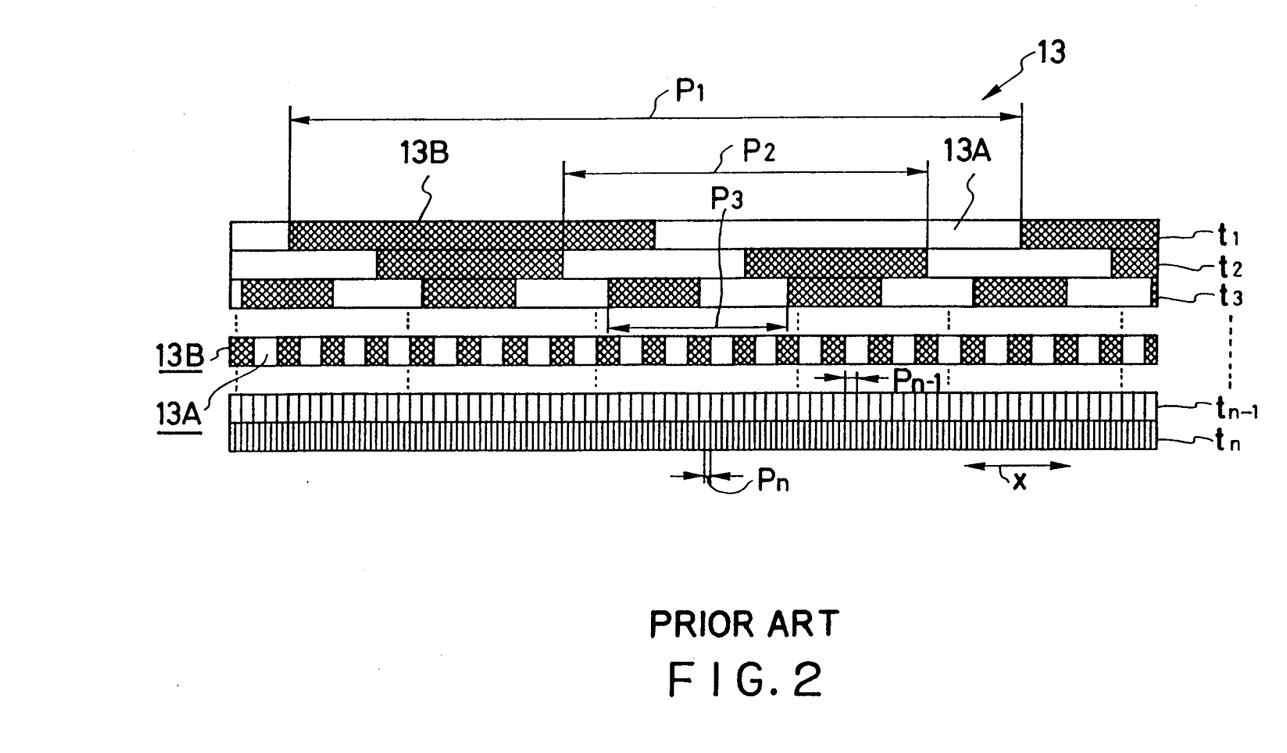
FIG. 2 illustrates an example of its grating tracks.
Figure 3:
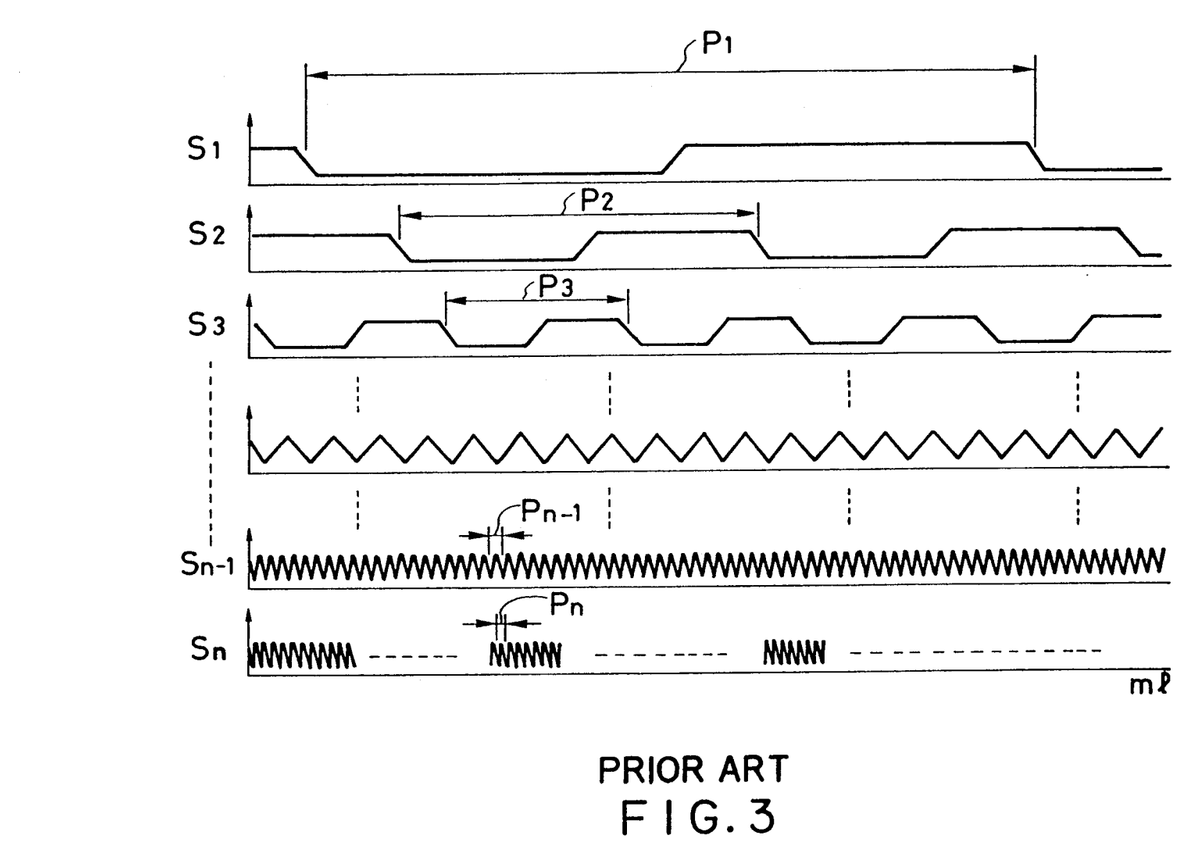
FIG. 3 is wave charts to illustrate an example of its electrical signals.
Figure 4:
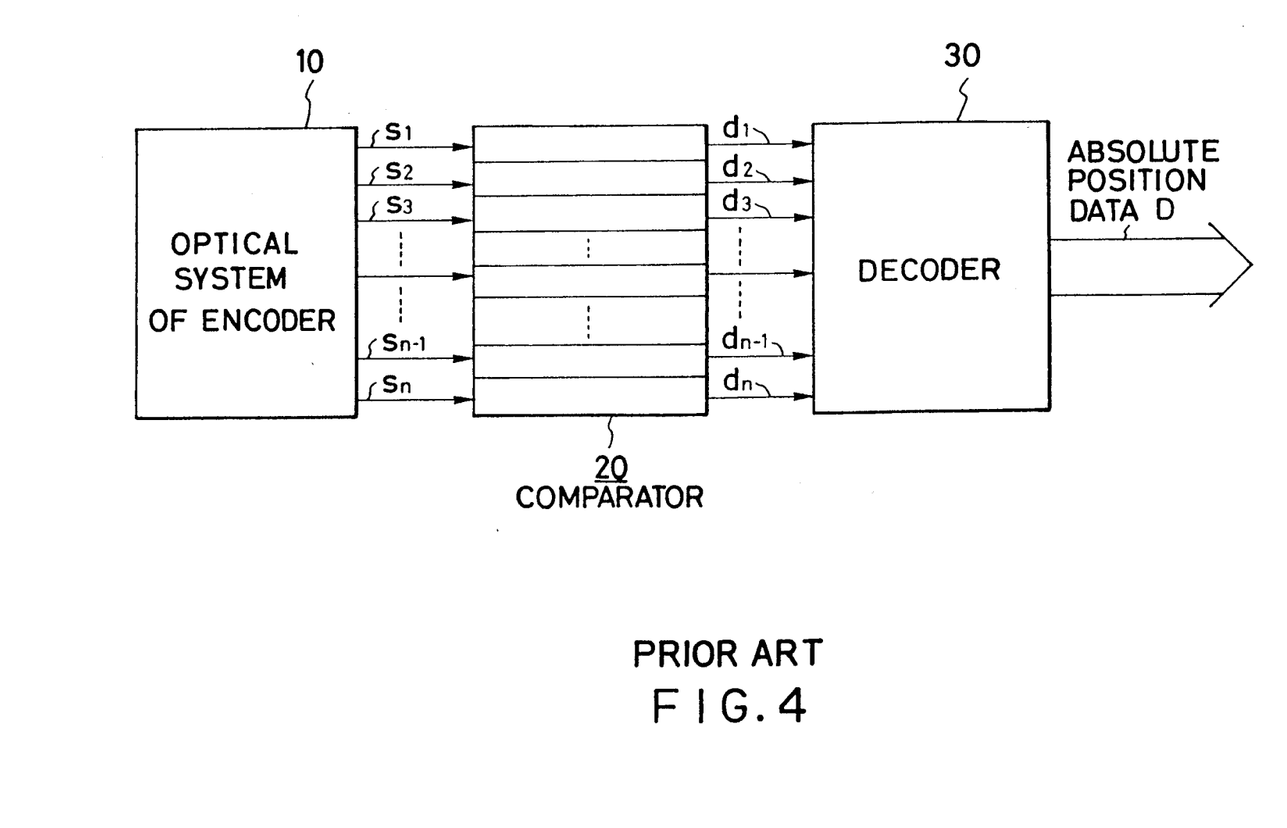
FIG. 4 is a block diagram to illustrate an example of its reading device.

The first scale 13 for use in the optical system 10 of the optical absolute position encoder thus-constituted is provided with an alternative binary code (a gray code) in which the grating pitches $P_1, P_2, P_3, \ldots, P_{n-1},$ and $P_n$ of the adjacent grating tracks $t_1$ and $t_2$, $t_2$ and $t_3, \ldots, t_{n-1}$ and $t_n$ as shown in FIG. 2 hold a proportional relationship of 1:2. The light beams $Lc_1, Lc_2, Lc_3, \ldots, Lc_{n-1}$ and $Lc_n$ pass through the transmissible portions 13A of each of the grating tracks $t_1, t_2, t_3, \ldots, t_{n-1}$ and $t_n$ of the first scale 13 and the transmissible windows $14A_1, 14A_2, 14A_3, \ldots, 14A_{n-1}$ and $14A_n$ of the second scale 14 which correspond to the grating tracks $t_1, t_2, t_3, \ldots, t_{n-1}$ and $t_n$. Then, the light beams $Lc_1, Lc_2, Lc_3, \ldots, Lc_{n-1}$ and $Lc_n$ are made incident upon the photoelectrical converting elements 15-1, 15-2, 15-3, $\ldots,$ 15-$n-1$ and 15-$n$. As a result, the intensities of the above-described light beams $Lc_1, Lc_2, Lc_3, \ldots, Lc_{n-1}$ and $Lc_n$ are respectively periodically changed in accordance with the lengthwise directional movement (designated by an arrow x) of the first scale 13. As a result, the electric signals, which are generated by the converting operations performed in the photoelectrical converting elements 15-1, 15-2, 15-3, $\ldots,$ 15-$n-1$ and 15-$n$, are also changed in accordance with the above-described changes of the intensities. In FIG. 3, the abscissa axis stands for the lengthwise directional displacement ml of the first scale 13 and the ordinate axis stands for electric signals $S_1, S_2, S_3, \ldots, S_{n-1}$ and $S_n$ generated by the conversion performed by the corresponding photoelectrical converting elements 15-1, 15-2, 15-3, $\ldots,$ 15-$n-1$ and 15-$n$. As can be clearly seen from FIG. 3, each of the electrical signals $S_1, S_2, S_3, \ldots, S_{n-1}$ and $S_n$ are periodically changed. The electrical signals $S_1, S_2, S_3, \ldots, S_{n-1}$ and $S_n$ are then, as shown in a block diagram shown in FIG. 4 which illustrates the optical absolute position encoder, digitized into signals $d_1, d_2, d_3, \ldots, d_{n-1}$ and $d_n$ by a comparator 20. Then, they are converted by a decoder 30, from the alternative binary code into absolute position data D in a desired form such as a pure binary code, a BCD code or the like.

An optical absolute position encoder for measuring a position must have a further improved position detecting resolution so as to detect a further small displacement quantity. Furthermore, there is a desire of an optical absolute position encoder capable of detecting the absolute position for a longer stroke. However, optical absolute position encoders of the type described above have an unsatisfactory minimum position detecting resolution which is substantially the same as the grating pitch $P_n$ of the grating track $t_n$ which has been divided into minimum sections. Furthermore, the absolute position detecting stroke is substantially the same as the grating pitch $P_1$ of the grating track $t_1$ which has been divided into maximum sections. Therefore, the position detecting resolution cannot be improved and the absolute position detecting stroke cannot be lengthened while reducing the overall size of the optical absolute position encoder because the number n of the grating tracks is increased excessively. Another problem will take place in that the number of the photoelectrical converting elements, comparators or the like which are the elements of the optical absolute position encoder is increased undesirably.

SUMMARY OF THE INVENTION

To this end, an object of the present invention is to provide a small optical absolute position encoder revealing high position detecting resolution and long absolute position detecting stroke.

In order to achieve the above-described object, according to one aspect of the present invention, there is provided an absolute position encoder comprising: a light source for emitting parallel light beams having coherence; a first scale having a first grating track and a grating window track in which grating windows, each of which is composed of a diffraction grating, are properly disposed; a second scale which has a second diffraction grating track and which relatively moves with respect to the first scale; a photoelectrical converting means for receiving a light beam, which has passed through or has been reflected by the first and second diffraction grating tracks, so as to convert the light beam into a first electrical signal; a first reading means for reading the relative displacement between the first scale and the second scale in accordance with the first electrical signal; a beam spot position detecting means for receiving the light beam, which has passed through or has been reflected by the grating window track, so as to convert the position of the beam spot of the light beam into a second electrical signal; a second reading means for reading the absolute position of the first scale in accordance with the second electrical signal; and a combining and calculating means for combining the read relative displacement with the absolute position so as to obtain and output position data of the first scale.

According to another aspect of the present invention, the diffraction grating which constitutes the grating window is disposed to diffract the light beam at a specific angle, direction or intensity for each of the grating windows.

According to another aspect of the present invention, one or more diffraction grating track and the grating window are included in the range of the parallel light beams emitted from the light source.

Other and further objects, features and advantages of the invention will be appear more fully from the following description.

DESCRIPTION OF THE PREFERRED EMBODIMENT

Figure 5:
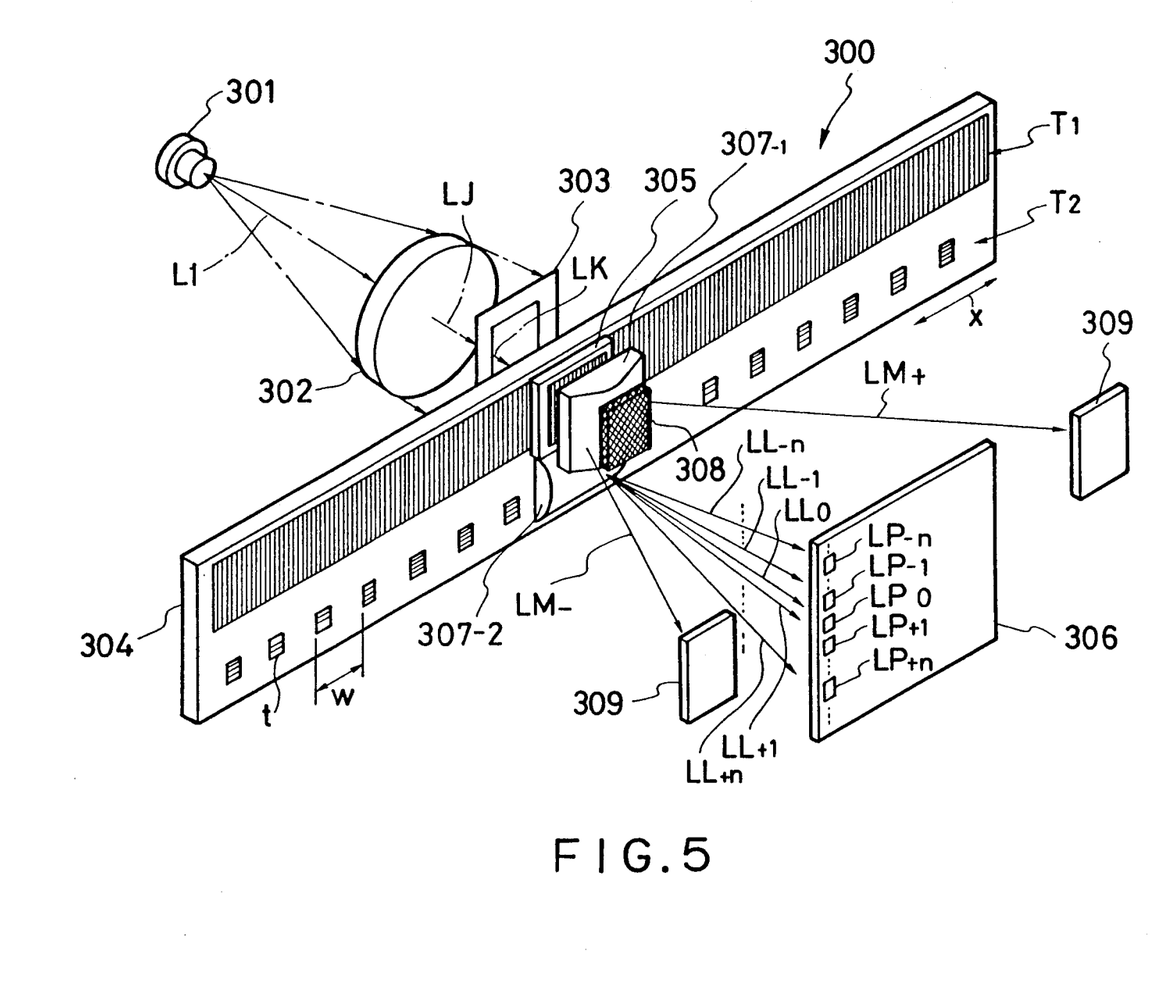
FIG. 5 is a perspective structural view which illustrates an optical system of an embodiment of an optical absolute-position encoder according to the present invention.

FIG. 5 is a perspective structural view which illustrates an optical system of an embodiment of an optical absolute position encoder according to the present invention. Referring to FIG. 5, the optical absolute position encoder according to the present invention comprises a collimator lens 302 for forming coherent measuring light beams LI emitted from a light emitting element 301, for example, an LD (Laser Diode), into parallel beams LJ. The optical absolute position encoder further comprises a slit 303 for partially transmitting the parallel beams LJ, which have been made parallel by the above-described collimator lens 302, so as to form them into a beam LK of a predetermined width. The optical absolute position encoder further comprises an elongated main scale 304 having a diffraction grating track $T_1$ of a predetermined grating constant and a grating window track $T_2$ in which grating windows t each of which is made of a diffraction grating are disposed at predetermined intervals W. The optical absolute position encoder further comprises a beam spot position detecting element 306, for example, an image sensor, for detecting the positions of beam spots $LP_0$, $LP_{\pm 1}$, ..., $LP_{\pm n}$, ... of diffracted light beams $LL_0$, $LL_{\pm 1}$, ..., $LL_{\pm n}$ transmitted from a cylindrical lens 307-2 for converging a plurality of diffracted light beams which have been diffracted by the diffraction windows t of the main scale 304. The beam spot position detecting element 306 subsequently converts the detected positions of the beam spots $LP_0$, $LP_{\pm 1}$, ..., $LP_{\pm n}$, ... into electrical signals. The optical absolute position encoder still further comprises an index scale 305 having a diffraction grating track which relatively moves with respect to the diffraction grating track $T_1$. Then, a plurality of diffracted light beams diffracted by the above-described two diffracted gratings are converged by a cylindrical lens 307-1. Furthermore, only a diffracted light beam LM± of a desired order is received by a blocking plate 308, the received diffracted light beam LM± of the desired order being converted into an electrical signal by a photoelectrical converting element 309. The light emitting element 301, the collimator lens 302, the slit 303, the cylindrical lenses 307-1 and 307-2, the index scale 305, the beam spot position detecting element 306, the photoelectrical converting element 309 and the blocking plate 308 which are respectively fixedly disposed on a straight line may be capable of moving relative to the position of the main scale 304. According to this embodiment, the main scale 304 linearly moves in the lengthwise direction (designated by an arrow X). Each of the diffraction gratings of the diffraction windows t of the grating window track $T_2$ has the same ratio of the light transmissible portion and the non-transmissible portion and the same direction of the diffraction line but has a different pitch in each of the diffraction windows.

In the optical system 300 of the optical absolute position encoder thus-constituted, the angle (hereinafter called "diffraction angle") $\pm \theta_n$ made between the 0-order diffracted light beam $LL_0$ and the positive and the negative diffracted light beams $LL_{\pm n}$ of the diffracted light beams $LL_0$, $LL_{\pm 1}$, ..., $LL_{\pm n}$, ... transmitted from the cylindrical lens 307-2 is expressed by an equation of the relationship between the pitch PP of the diffraction gratings of the grating windows t of the main scale 304 and the wavelength λ of a light beam LK transmitted from the slit 303.

$$\pm \theta_n = \pm \sin^{-1}(n\lambda/PP) \quad (1)$$

The beam spots $LP_{+n}$ and $LP_{-n}$ of the positive and the negative n-order diffracted light beams on the beam spot position detecting element 306 are disposed away from each other by distance $dd_n$ when an assumption is made that the distance between the main scale 304 and the beam spot position detecting element 306 is SS.

$$dd_n = 2 \, SS \cdot \tan(\sin^{-1}(n\lambda/PP)) \quad (2)$$

Figure 6:
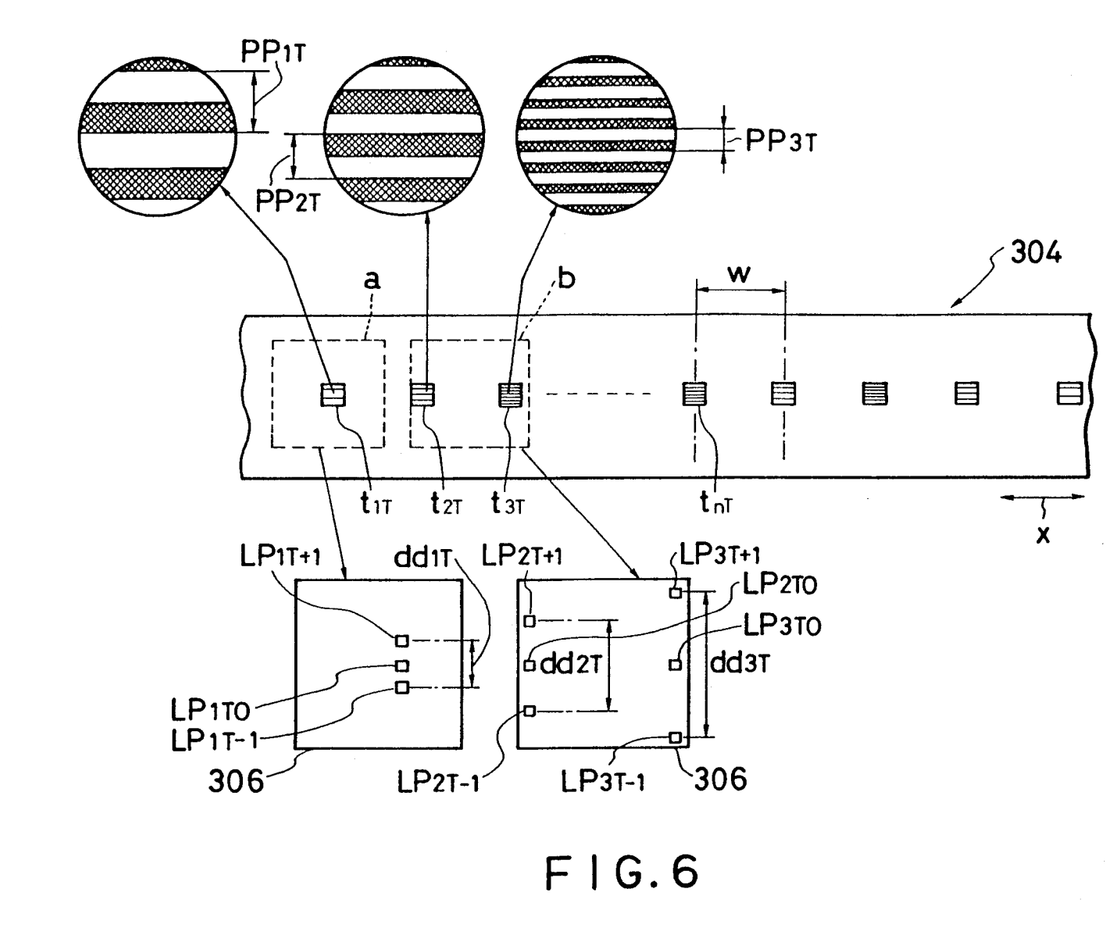
FIG. 6 is a view to illustrate an example of grating window tracks included in the optical scale.

In a case as shown in FIG. 6 where the main scale 304 is shifted to the left in FIG. 6 and the irradiation range of the light beam LK transmitted from the slit 303 is changed from a to b, the beam spots $LP_{1T0}$, $LP_{2T0}$, $LP_{3T0}$ of the 0-order diffracted light beam on the beam spot position detecting element 306 and the beam spots $LP_{1T\pm 1}$, $LP_{2T\pm 1}$ and $LP_{3T\pm 1}$ of the 1-order diffracted light beam become as shown in FIG. 6. Therefore, the distances $dd_{1T}$, $dd_{2T}$ and $dd_{3T}$ between the beam spots of each of the 1-order diffracted light beams can be calculated.

$$dd_{1T} = 2\, SS \cdot \tan\left(\sin^{-1}\left(\lambda/PP_{1T}\right)\right) \quad (3)$$

$$dd_{2T} = 2\, SS \cdot \tan\left(\sin^{-1}\left(\lambda/PP_{2T}\right)\right) \quad (4)$$

$$dd_{3T} = 2\, SS \cdot \tan\left(\sin^{-1}\left(\lambda/PP_{3T}\right)\right) \quad (5)$$

Therefore, the distance $dd_{nT}$ between the beam spots $LP_{nT\pm1}$ of the positive and the negative 1-order diffracted light beams on the beam spot position detecting element 306 is obtained from the positions of the above-described beam spots $LP_{nT\pm1}$. Then, the pitch $PP_{nT}$ of the diffraction gratings is obtained from the distance $dd_{nT}$ of the diffraction gratings is obtained from the distance $dd_{nT}$ between the beam spots so that the grating window $t_{nT}$ on the main scale 304 is specified. Furthermore, the absolute position of the grating window in interval W is obtained from the position of the beam spot $LP_{nT0}$ of the 0-order diffracted light beam on the beam spot position detecting element 306. As a result, absolute position data $P_{0Sn}$ on the main scale 304 can be obtained.

The light beam, which has passed through the diffraction grating track $T_1$ of the main scale 304, passes through the diffraction grating of the index scale 305 having a grating constant which corresponds to the grating constant of the diffraction grating on the track $T_1$. Then, the light beam posses through the cylindrical lens 307-1 before it is made incident upon the photoelectrically converting element 309 so that it is converted into an electrical signal. If the main scale 304 is displaced at this time, the relative position between the diffraction grating on the main scale 304 and that on the index scale 305 is changed. As a result, the quantity of light which passes through the two scales 304 and 305 is changed so that an electrical signal Xa, which corresponds to the above-described change in the quantity of light, can be obtained from the photoelectrical converting element 309. The relative displacement of the main scale 304 with respect to the index scale 305 can be precisely measured by using the above-described electrical signal Xa. Relative displacement data $P_{0S1}$ obtainable here is an extremely precisely measured value in comparison to the above-described absolute position data $P_{0Sn}$ although the measuring range is small in comparison to the same.

Figure 7:
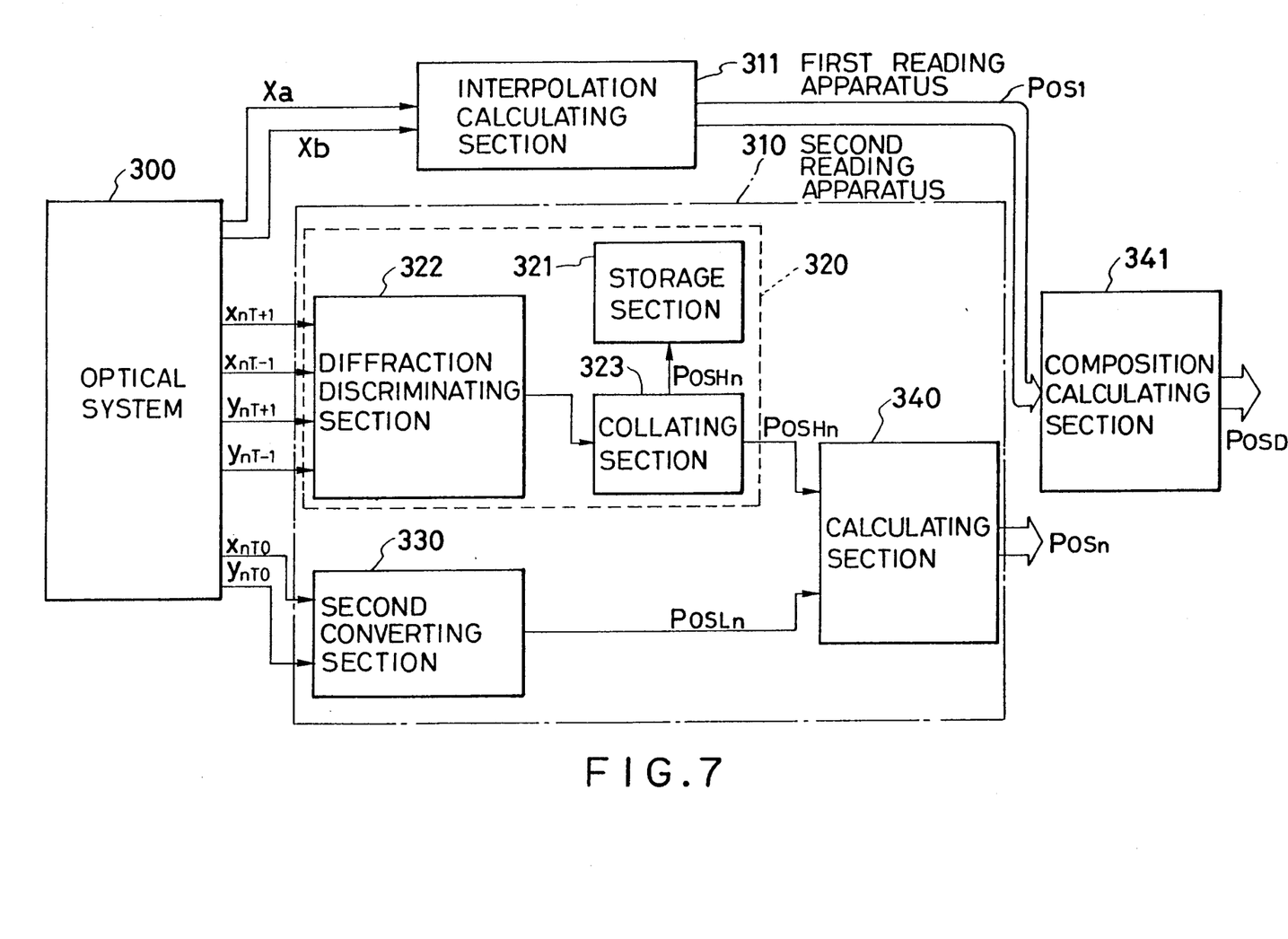
FIG. 7 is a block diagram to illustrate an example of the reading device.

FIG. 7 is a block diagram which illustrates an embodiment of the optical absolute position encoder according to the present invention. The optical absolute position encoder according to the present invention is constituted by: the above-described optical system 300; a first reading apparatus 311 comprising a built-in calculating section; and a second reading apparatus 310 comprising a first converting section 320, a second converting section 330 and a calculating section 340.

The first reading apparatus 311 receives electrical signals Xa and Xb (Xa and Xb are two-phase signals having a predetermined phase difference) which correspond to the relative displacement between the main scale 304 and the index scale 305. The first reading apparatus 311 then calculates the relative displacement data $P_{0S1}$ by using the above-described electrical signals Xa and Xb so as to output the result of the calculation. The range of the above-described relative displacement data $P_{0S1}$ in which the absolute position can be detected corresponds to the period of each of the electrical signals Xa and Xb.

Figure 8:
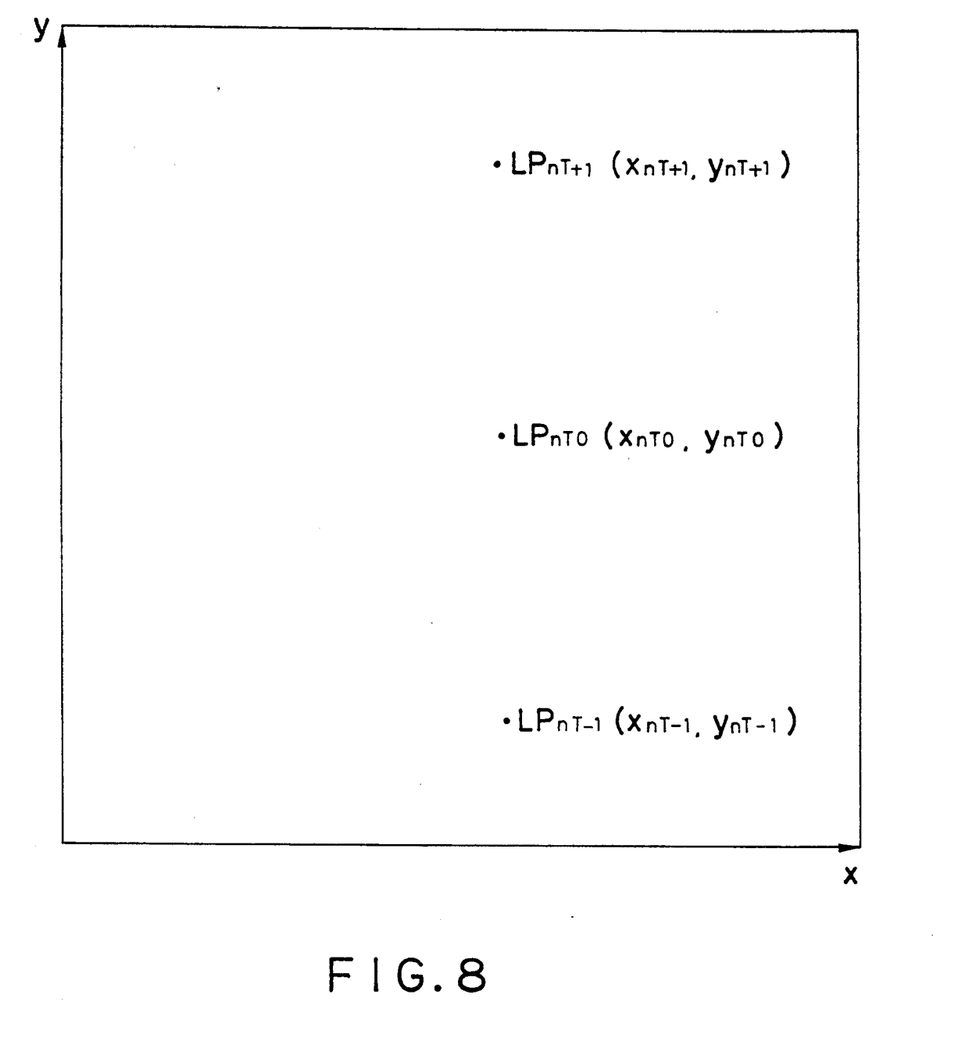
FIGS. 8, 9, and 10 respectively illustrate a reading operation performed by the optical absolute position encoder according to the present invention.

A diffraction discriminating section 322 receives coordinates $(x_{nT+1}, y_{nT+1})$, $(x_{nT-1}, y_{nT-1})$, as shown in FIG. 8, the coordinates $(x_{nT+1}, y_{nT+1})$, $(x_{nT-1}, y_{nT-1})$ showing the positions of the beam spots $LP_{nT\pm1}$ of, for example, the 1-order diffracted light beam on the beam spot position detecting element 306. The diffraction discriminating section 322 calculates the distance $dd_{nT}$ between the beam spots so that the pitch $PP_{nt}$ between the diffraction gratings is obtained.

$$dd_{nT} = \sqrt{(x_{nT+1} - x_{nT-1})^2 + (y_{nT+1} - y_{nT-1})^2} \quad (6)$$

A storage section 321 stores the position data $P_{0SH1}$, $P_{0SH2}$, ..., $P_{0SHn}$ of the grating windows $t_{1T}, t_{2T}, \ldots, t_{nT}, \ldots$ on the scale 304 and the pitches $PP_{1T}, PP_{2T}, \ldots, PP_{nT}, \ldots$ between the diffraction gratings in such a manner that they correspond to one another. A collating section 323 reads, from the storage section 321, the position data $P_{0SHn}$ of the grating window $t_{nT}$, which corresponds to the pitch $PP_{nt}$ between the diffraction gratings supplied from the diffraction discriminating section 322, the position data $P_{0SHn}$ being then transmitted to the calculating section 340.

On the other hand, the second converting section 330 receives coordinates $(x_{nT0}, y_{nT0})$, as shown in FIG. 8, the coordinates $(x_{nT0}, y_{nT0})$ showing the positions of the beam spot $LP_{nT0}$ of the 0-order diffracted light beam on the beam spot position detecting element 306. The second converting section 330 then obtains the absolute position $P_{0SLn}$ of the grating window $t_{nT}$ on the scale 304 in the interval W so as to transmit the absolute position $P_{0SLn}$ to the calculating section 340. The above-described absolute position $P_{0SLn}$ may be obtained by using the coordinates $(x_{nT+1} - x_{nT-1})/2$ of the intermediate point of the beam spots $LP_{nT\pm1}$ of the 1-order diffracted light beam as an alternative to the coordinates $(x_{nT0}, y_{nT0})$ of the beam spot $LP_{nT0}$ of the 0-order diffracted light.

Figure 9:
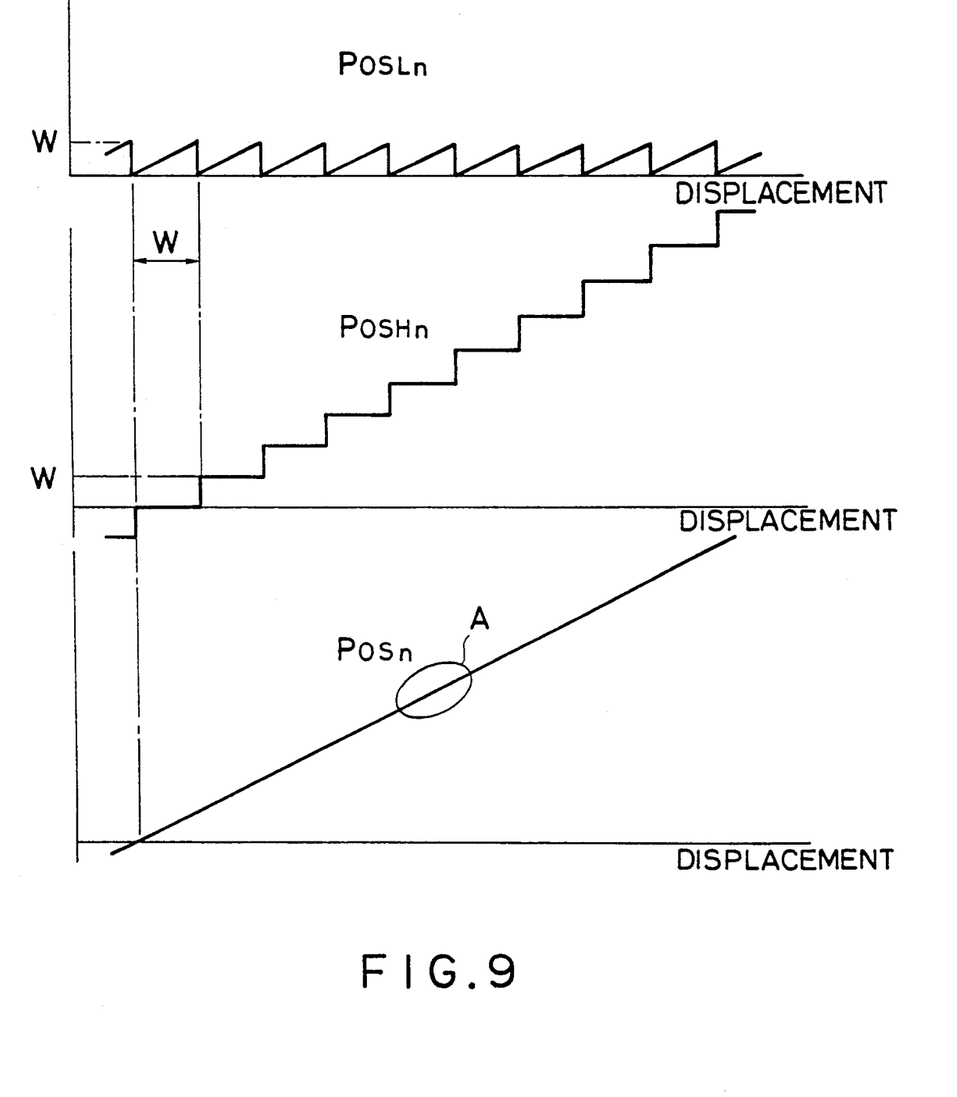
Figure 10:
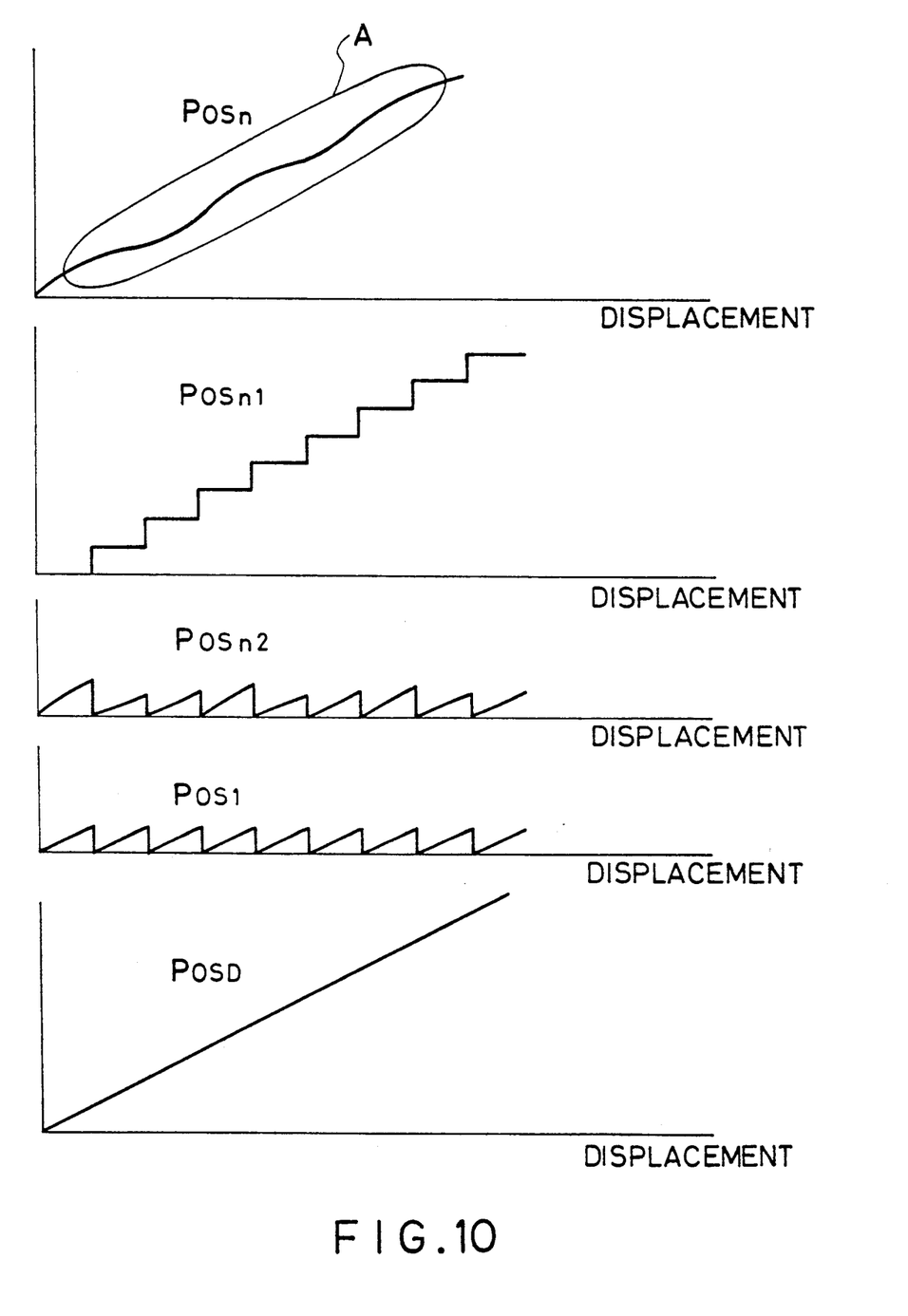

Since the above-described position data $P_{0SHn}$ and $P_{0SLn}$ are changed as shown in FIG. 9 in accordance with the displacement of the main scale 304, the calculating section 340 adds the position data $P_{0SHn}$ to $P_{0SLn}$ so as to obtain and transmit the absolute position data $P_{0SLn}$ on the main scale 304. However, the accuracy of the absolute position data thus obtained is unsatisfactory in a position detection performed in a level within a range between 0.1 and 0.01 μm as shown in FIG. 10 which is an enlarged view of the range A of $P_{0Sn}$ shown in FIG. 9. Therefore, the absolute position data $P_{0Sn}$ is classified into upper data $P_{0Sn1}$, the minimum unit of which is the predetermined period P, and lower data $P_{0Sn2}$ the absolute position range of which is P. The above-described period P is the period of the relative displacement data $P_{0S1}$ obtained by the first reading apparatus 311 comprising the built-in calculating section. As an alternative to the above-described lower data $P_{0Sn2}$, the relative displacement data $P_{0S1}$ may be used in such a manner that it is combined with $P_{0Sn1}$. In this case, accurate position data $P_{0SD}$ revealing a wide range, in which the measurement can be performed, can be obtained. In order to correctly combine $P_{0S1}$ with $P_{0Sn1}$, the alignment of the digits may be discriminated by using $P_{0Sn2}$.

According to the above-described embodiment, the description is made about the case in which the pitches of the diffraction gratings of the grating windows t of the grating window track $T_2$ on the main scale 304 are different in each of the grating windows. The absolute position data on the scale can be obtained if a scale arranged in such a manner that the ratio of the transmissible portion and the non-transmissible portion is different in each of the grating windows or a scale arranged in such a manner that the direction of the grating line is different in each of the grating windows is used. That is, the arrangement, in which the ratio of the transmissible portion and the non-transmissible portion is changed, utilizes the fact that the intensity ratio of the diffracted light beams of the different orders is changed in accordance with the ratio of the transmissible portion and the non-transmissible portion. Therefore, the grating window can be specified by a structure arranged in such a manner that the diffraction discriminating section 322 has a criterion established on the above-described principle. The arrangement, in which the direction of the diffraction line is changed, utilized the fact that the position of the beam spot of the positive and the negative diffracted light beams of the same order is shifted (rotated) in accordance with the direction of the grating line. Also in this case, the grating window can be specified by a structure arranged in such a manner that the diffraction discriminating section 322 has a criterion established on the above-described principle. Furthermore, the main scale 304 can be made to be a further elongated scale by specifying a grating window group which includes two or more grating windows and the diffracting methods in these grating windows are combined with each other in a specified manner.

In a case where two sets of grating windows are included in a range which is irradiated with the light beam LK as shown by symbol b of FIG. 6, the absolute position data on the scale 304 may be obtained in each of the grating windows by the second reading apparatus 310 so as to average the obtained absolute data. The error factor the period of which is the interval W of the grating windows can be reduced if each of the absolute position data items is weighted at the time of the above-described averaging process.

Although the diffracted light beam is, according to the above-described embodiment, obtained by causing the coherent light beam emitted from the light emitting element to transmit the scale, the structure may be arranged to be a reflecting type structure because there is no difference between the characteristics of the transmitted light beam and those of the reflected light beam.

Furthermore, the structure may be arranged in such a manner that the main scale 304 is formed into a disc-like shape, the diffraction grating track $T_1$ and the diffraction window track $T_2$ are formed on the surface of the main scale 304 in the form of an annular shape and they are rotated while making the center of the scale to be the rotational axis. In this case, the absolute angle can be detected.

As described above, according to the optical absolute-position encoder according to the present invention, the conventional structure in which the absolute position detection for a long stroke is performed by using a plurality of grating tracks can be significantly simplified such that it can be performed by a linearly-disposed grating window and one grating track. Therefore, the size of each of the elements can be reduced, causing the overall size of the optical absolute position encoder to be significantly reduced. Furthermore, the manufacturing cost of the optical absolute position encoder and the cost of the product can be reduced.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An absolute position encoder comprising:
   a light source for emitting parallel light beams having coherence;
   a scale having a grating window track in which grating windows are disposed in such a manner that at least one of said grating windows are included in the range of said parallel light beams emitted from said light source, each of said grating windows comprising a diffraction grating disposed to diffract said light beam at a specific angle, direction or intensity for each of said grating windows;
   a beam spot position detecting means for receiving said light beam, which has passed through or has been reflected by said grating window track, and for converting the position of the beam spot of said light beam into an electrical signal; and
   a reading means for reading and outputting the absolute position of said scale in accordance with said electrical signal.

2. An absolute position encoder comprising:
   a first position detecting system which has an absolute track of one track and which outputs position data $P_{osn\ l}$ within an absolute address range for a measuring length L;
   a second position detecting system which has an incremental track repeating a grating pitch P and which outputs position data $P_{osl}$ having a resolution P/n, n being an integer, under a condition that the grating pitch P is the absolute address; and
   a composition calculating section which outputs position data $P_{osd}$ having resolution P/n, under a condition that the measuring length L is the absolute address range, by combining the position data $P_{osn}$ from said first position detecting system with the position data $P_{osl}$ from said second position detecting system;
   an diffraction grating areas, of which grating lines are drawn in parallel in a scale longitudinal direction within a range of a width B, are disposed in the absolute track at each predetermined distance W in the scale longitudinal direction as long as a total (L/W+1) and a pitch of the grating lines of the diffraction grating areas is peculiar to the respective diffraction grating line areas of the total (L/W+1);
   wherein said first position detecting system comprises:
   a beam spot position detecting element for receiving diffraction light from the diffraction grating areas and for reading a moving amount in the scale longitudinal direction of the diffraction light and a position on a direction perpendicular to the scale longitudinal direction of the diffraction light;
   a converting section for obtaining position data $P_{osLn}$ that the distance W is the absolute address range due to the moving amount on the scale longitudinal direction of the diffraction light transmitted from said beam spot position detecting element;
   a diffraction grating area discriminating section for reading an identity $P_{Pnt}$ of the diffraction grating areas due to a position data on a direction perpendicular of the scale longitudinal direction of the diffraction light transmitted from the beam spot position detecting element;

an ID storage section for storing a relationship between the identity $P_{Pnt}$ of the diffraction grating areas and a position data $P_{oshn}$ of the resolution W that the measuring length L corresponding to the identity $P_{Pnt}$ is the absolute address;

a collating section for inputting the identity of the diffraction grating areas outputted from the diffraction grating area discriminating section and for obtaining and outputting position data $P_{ostm}$ corresponding to the identity $P_{Pnt}$ by referring to the ID storage section; and a calculating section for outputting position data $P_{osn}$ by combining the position data $P_{osn}$ with the position data $P_{osLn}$.

* * * * *